(12) United States Patent
Rosendorf

(10) Patent No.: US 7,801,788 B2
(45) Date of Patent: Sep. 21, 2010

(54) SECURITIES ANALYSIS METHOD AND SYSTEM

(76) Inventor: Charles Hillel Rosendorf, 595 Northfield Ave., #71, West Orange, NJ (US) 07052

( * ) Notice: Subject to any disclaimer, the term of this patent is extended or adjusted under 35 U.S.C. 154(b) by 1919 days.

(21) Appl. No.: 09/848,191

(22) Filed: May 3, 2001

(65) Prior Publication Data
US 2003/0028459 A1 Feb. 6, 2003

(51) Int. Cl.
*G06Q 40/00* (2006.01)
(52) U.S. Cl. .......................... 705/36; 705/37
(58) Field of Classification Search ............... 705/35, 705/36–37
See application file for complete search history.

(56) References Cited

U.S. PATENT DOCUMENTS

| | | | |
|---|---|---|---|
| 5,371,673 A * | 12/1994 | Fan ........................... 704/1 |
| 5,701,400 A | 12/1997 | Amado | |
| 5,799,287 A | 8/1998 | Dembo | |
| 6,128,402 A * | 10/2000 | Jones et al. ............... 382/135 |
| 6,473,084 B1 * | 10/2002 | Phillips et al. ............ 345/440 |
| 6,606,615 B1 * | 8/2003 | Jennings et al. ............ 706/45 |
| 6,718,535 B1 * | 4/2004 | Underwood .............. 717/101 |
| 6,792,399 B1 * | 9/2004 | Phillips et al. ............... 703/2 |

* cited by examiner

*Primary Examiner*—Thu Thao Havan
(74) *Attorney, Agent, or Firm*—Law Offices of Mitchell P. Novick; Benjamin Appelbaum

(57) ABSTRACT

A financial data analysis system comprises a computer having a communication means for obtaining data related to a security; means for storing the data in memory; means for obtaining a second data point and means for storing the second data point in memory; means for comparing the data from the data points with data of an additional data point, which is randomly chosen from between the data points; and a display means to display the compared data. The system orders the randomly chosen data points prior to comparing data, then displays it as, for example, a table, spreadsheet export file, or graph. The compared data can be exported to a method of analyzing financial data. An individual can track a securities portfolio, monitor performance and make investment decisions based on performance. This invention may also analyze non-financial data.

31 Claims, 7 Drawing Sheets

FIG. 2A

| | |
|---|---|
| 100 | METHOD OF SECURITIES ANALYSIS |
| 102 | LOAD PROGRAM IN COMPUTER MEMORY |
| 104 | OBTAIN DATA FROM THIRD PARTY PROVIDER 40 |
| |     HISTORICAL DATA (H4) 212 |
| |     DAILY DATA (CH) 214 |
| 106 | IMPORT (210) OBTAINED DATA INTO DATABASES 213, 215 AND 216 |
| 108 | DETERMINE SECURITY WHOSE PERFORMANCE IS TO BE EVALUATED |
| 110 | SELECT OR MANUALLY CREATE SYMBOL 204 OF SECURITY |
| 112 | SELECT OR MANUALLY CREATE DATA FOR MANUALLY CREATED SYMBOLS (VIEW MASTER FUNCTION 238) |
| 114 | SORT SYMBOLS 204 AND/OR NAMES 240 USING SORT FUNCTION 248 (OPTIONAL STEP): |
| |     CREATE GROUPS 244 AND |
| |     SUB-GROUPS 246 |
| 116 | COMPARISON OF SECURITIES DATA (FIG. 3) |
| 118 | RANDOM COMPARISON OF SECURITIES DATA |
| 120 | SINGLE DATA COMPARISON OF SECURITIES DATA |
| 122 | COMPARE RESULTS FUNCTION 300: |
| |     DISPLAY OF COMPARED DATA |
| 122a |     TABLE 302 |
| 122b |     SPREADSHEET 304 |
| |         SPREADSHEET EXPORT 306 |
| 122c |     GRAPH 308 |
| |         AUTOSCALE FUNCTION 310 |
| 124 | PRINTOUT OF REPORTS 206 |
| 126 | EXPORT DATA |
| 128 | STORE DATA |
| 130 | LOG CHANGES INTO PROCESS LOG 332, INTO PROCESS LOG DATABASE 334 |

FIG. 2B
SECURITIES ANALYSIS SYSTEM

IMPORT FUNCTION 210

DATABASES:
FIRST DATABASE 213
    HISTORICAL DATA (H4) 212
SECOND DATABASE 215
    DAILY DATA (CH) 214
MERGE 216 (HISTORICAL AND DAILY DATA)

HISTORIC-H4 FILE SPECIFICATIONS 232
DAILY-CH FILE SPECIFICATIONS 234
SAMPLE DATA FILES 236

DATE/RANGE COPY OR DELETE 250:
    COPY 252
    DELETE 254

RANDOM DATES FUNCTION 260
DATE CHECKING FUNCTION 264
ARCHIVE/RESTORE 312
ERASE 318
FILE OVERWRITE PROTECTION 320
ERASE DATABASES 322
MERGE 324
PROCESS LOG 328
WINDOWING 336
UTILITY 338

FIG. 3

| | |
|---|---|
| 116 | COMPARISON OF SECURITIES DATA |
| | SEQUENTIAL COMPARISONS |
| 116a | "WITH FROM" |
| 116b | "WITH TO" |
| 116c | "UNTIL TO" |
| 116d | "UNTIL FROM" |

FIG. 4

SINGLE DATE COMPARISON FUNCTION 270

SINGLE DAY COMPARISON 272

DAY xx AT yy HR

DAY xx AT zz HR

SINGLE DAY COMPARISON 274

DAY xx AT yy HR

DAY xx+n AT nn HR

FIG. 5

IMPORT FUNCTIONS 210

CHOOSE IMPORT DEFAULT 326

MENU

MANUAL IMPORT 328

IMPORT SYMBOLS, DATES AND PRICES

AUTO IMPORT SCHEDULER 330

IMPORT SYMBOLS, DATES AND PRICES AT FREQUENCY AND TIMES CHOSEN BY USER

STORE DATA

COMPARE 202

MAINTAIN DATA LIMIT DATABASE SIZE, MERGE SYMBOLS AND DATE RANGES ----------------→ BACKUP DATA ARCHIVE 314/ RESTORE 316

SECURITIES ANALYSIS METHOD AND SYSTEM

FIELD OF THE INVENTION

The present invention relates to a system and method for analysis of data with reference to a benchmark data point. The present invention is particularly suited for analyzing the performance of securities, such as stocks, mutual funds or the like over a period of time.

BACKGROUND OF THE INVENTION

In U.S. Pat. No. 3,270,190 Lambert discloses a securities evaluator which is mechanically programmed with ten years of data for securities. Based on a formula to fit the data of prior years, the inventor claims the high and low stock price for the coming year can be determined from the estimated range of variables input by the user for the coming year. The evaluator has no means of having the financial data contained therein automatically updated.

In U.S. Pat. No. 5,414,838 Kolton et al. disclose a system for extracting historical market information with condition and attributed windows. The system includes facilities for including domain knowledge in a query, such as market knowledge of calendar events, holidays, triple-witching hours and option expiration dates. Additional facilities enable the user to include dates of political elections, date of issuance and value of company earning reports and the like in the query. The dates from which a user can choose to extract historical information are determined by the system, and unlike the present invention, do not offer the user the ability to randomly choose time points between data points chosen by the user.

Chennault (U.S. Pat. No. 5,930,774) discloses a method and computer program for evaluating mutual fund portfolios to enable an investor to determine the diversity, or lack thereof, of at least two mutual funds. The invention determines whether the funds are really different from each other, or if the funds include similar positions or securities in different market sectors, such as, for example, consumer goods, energy or pharmaceuticals, determines just how different these funds actually are from one another.

U.S. Pat. No. 5,946,666 (Nevo et al.) discloses a system for the simultaneous monitoring and subsequent analysis of financial securities to provide a basis for future investment or divestiture. The system analyzes data taken from time periods such as seconds, minutes, hours, or days to longer periods of a year or more.

The Nevo et al. system appears to limit the number of securities to be displayed at any particular time to three (3), in contrast to the present invention which can analyze and display data from up to several dozen securities. Nevo et al. do not explicitly explain how the sampling period is modified, whereas the present invention includes a number of different ways of determining the sampling period, ranging from fixed periods of time to random time periods.

Black et al. (U.S. Pat. No. 6,012,042) discloses a data conversion device for converting both technical and fundamental data about a security into a unified format for analysis by an analysis process engine. The invention creates records for each calendar day, by the steps of deleting a plurality of technical data records from a multiplicity of technical data records, and inserting a fundamental data value into the multiplicity of records, in order to correct for "nil" values that would occur when no data is available for a particular security at a particular date. The analysis process engine processes the disparate data according to a set of rules, and the results are forwarded to a display for viewing or used for further analysis.

The present invention permits a user to compare up to 126 securities simultaneously. The present invention offers the user an option to choose any start and end date (as opposed to a preset default sampling period), and the ability to randomly choose additional dates to use during the comparison process. Further, the present invention enables the user to compare the performance of multiple types of securities, such as equities and mutual funds, simultaneously.

BRIEF SUMMARY OF THE INVENTION

An object of the present invention is to provide a system that can analyze the performance of a financial vehicle using realtime data.

Another object of the present invention is to provide an analysis system that can analyze the performance of a financial vehicle over a period of time.

Another object of the present invention is to provide an analysis system that can analyze the performance of a financial vehicle over a randomly determined time period.

Yet another object of the present invention is to provide an analysis system that is platform independent and that can be used on a variety of devices.

Still another object of the present invention is to provide an analysis system that can track the performance of numerous financial vehicles simultaneously.

Another object of the present invention is to provide a securities analysis system whose data can be output in a variety of manners, such as graphically, tabularly, or electronically in a format such as a spreadsheet.

Still another object of the present invention is to provide a securities analysis system whose compared data can be exported into a downstream analytical tool, such as a second financial analysis program.

Another object of the present invention is to provide a method to analyze the performance of a financial vehicle using realtime data.

Still another object of the present invention is to provide a method to analyze the performance of a financial vehicle over a period of time.

Another object of the present invention is to provide a method to analyze the performance of a financial vehicle over a randomly determined time period.

Yet another object of the present invention is to provide a method of analysis that is platform independent and that can be practiced using a variety of devices.

Still another object of the present invention is to provide a method of analysis that can track the performance of numerous financial vehicles simultaneously.

Another object of the present invention is to provide a method of analysis in which data can be output in a variety of manners, such as graphically, tabularly, or electronically in a format such as a spreadsheet.

Still another object of the present invention is to provide a method of analysis in which the analyzed data can be exported into a second analytical tool, such as a financial analysis program.

The present invention permits a user to compare a number of financial vehicles simultaneously. In an embodiment of the present invention, the user can analyze the data for up to 126 financial vehicles simultaneously. A significant feature of the present invention is the option available to a user to choose any start and end date and time for performing the analysis (as opposed to a preset default sampling period). The present invention enables a user to compare the performance of multiple securities simultaneously.

The present invention is a system for analyzing financial data comprising a computer having a communication means for obtaining one or more points of data related to a security; means for storing the obtained data in a memory; a means for obtaining a second point of data related to the security and a means for storing the second data point in the memory; a means for comparing the data from the obtained data points with the data of an additional data point related to the security, the additional data point being randomly chosen from between the obtained data points; and a display means to display the analyzed data. The data points between which the analysis is made can also be randomly chosen. The system orders the randomly chosen data points prior to comparing the data, which is displayed in a format such as a table, exported spreadsheet format file, or graph. The compared data can be exported to a method of analyzing financial data. Using the present invention, an individual can track a securities portfolio, monitor its performance and make investment decisions based on performance.

BRIEF DESCRIPTION OF THE SEVERAL VIEWS OF THE DRAWING

FIG. 2A is a flow chart summarizing the method of the present invention.

FIG. 2B summarizes functions of the present invention.

FIG. 3 summarizes the analysis functions of the present invention.

FIG. 4 summarizes the single date analysis function.

FIG. 5 summarizes the import functions.

DETAILED DESCRIPTION OF THE INVENTION

As used within the context of the present specification, the term "security" is intended to encompass various financial vehicles, including stocks (equities), bonds (all types, including corporate, government, municipal, high yield, so called "junk bonds", and the like), mutual funds, commodities, options (puts and calls), derivatives, and various indices and benchmarks used by the financial industry. The terms "security" or "securities" and "financial vehicle" will be used interchangeably in the present specification. Among these indices and benchmarks are such indices as the Dow Jones Industrial Index ("DJIA"), the Standard and Poors 500 Index ("S&P500"), the Russell 2000, and the like, which are intended as examples only and not intended to be any limitation.

In securities and other analyses, a data point is commonly referenced by the date and/or time corresponding to such data point; however, there need not be such limitations. Thus, throughout this specification, a data point is sometimes referred to by the corresponding date/time and sometimes as merely a "point".

The present invention is designed for use on a computer system. The computer system may be an individual personal computer, a computer network, or a portable computer or similar handheld device, such as a pocket computer marketed by companies such as Compaq or Hewlett-Packard. The present invention is capable of use on devices which include a software program comprising an emulator for the Disk Operating System ("DOS"), such as the product sold under the tradename Microsoft DOS (TM).

Figure 1A:
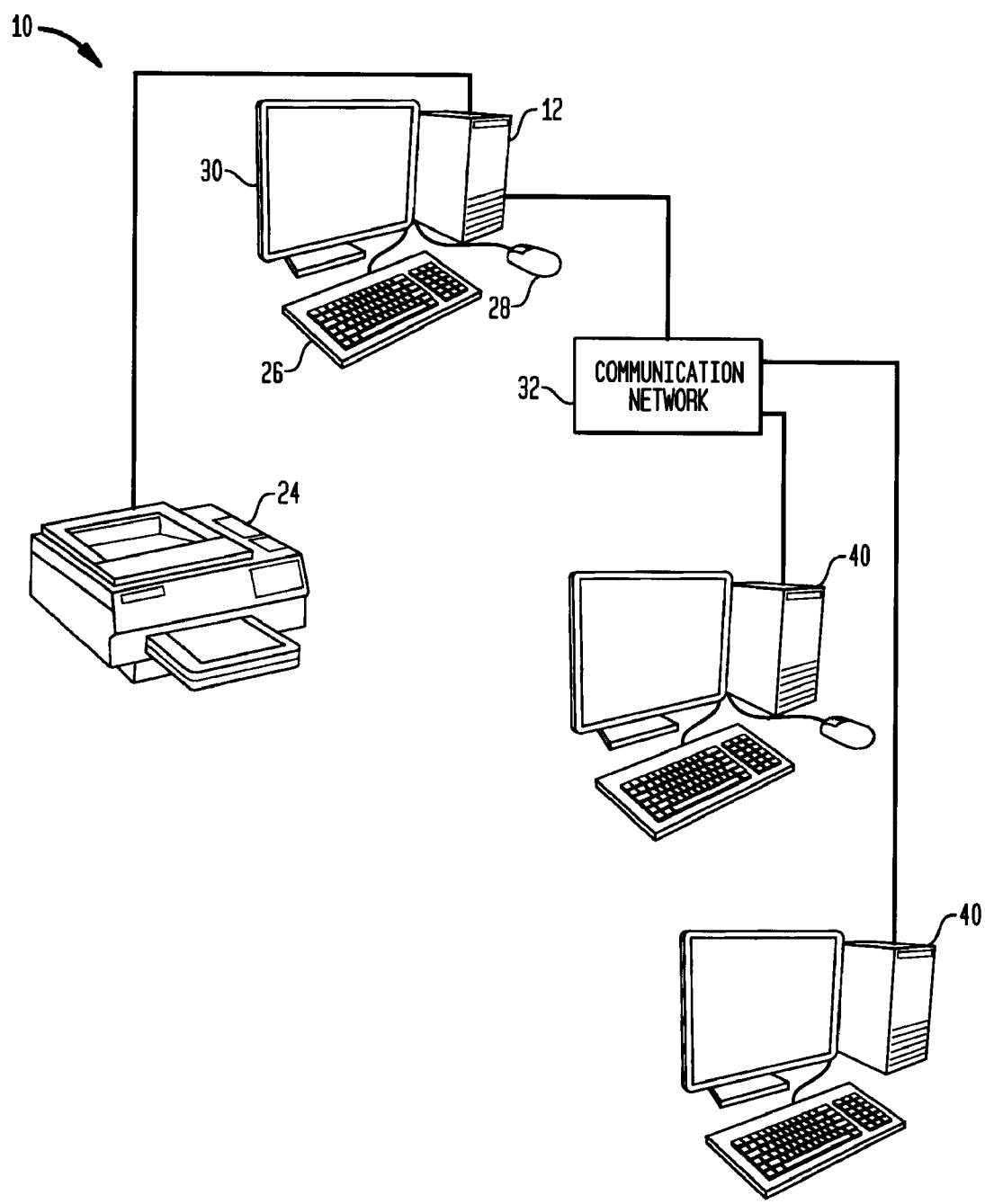
FIG. 1A illustrates the system of the present invention.
Figure 1B:
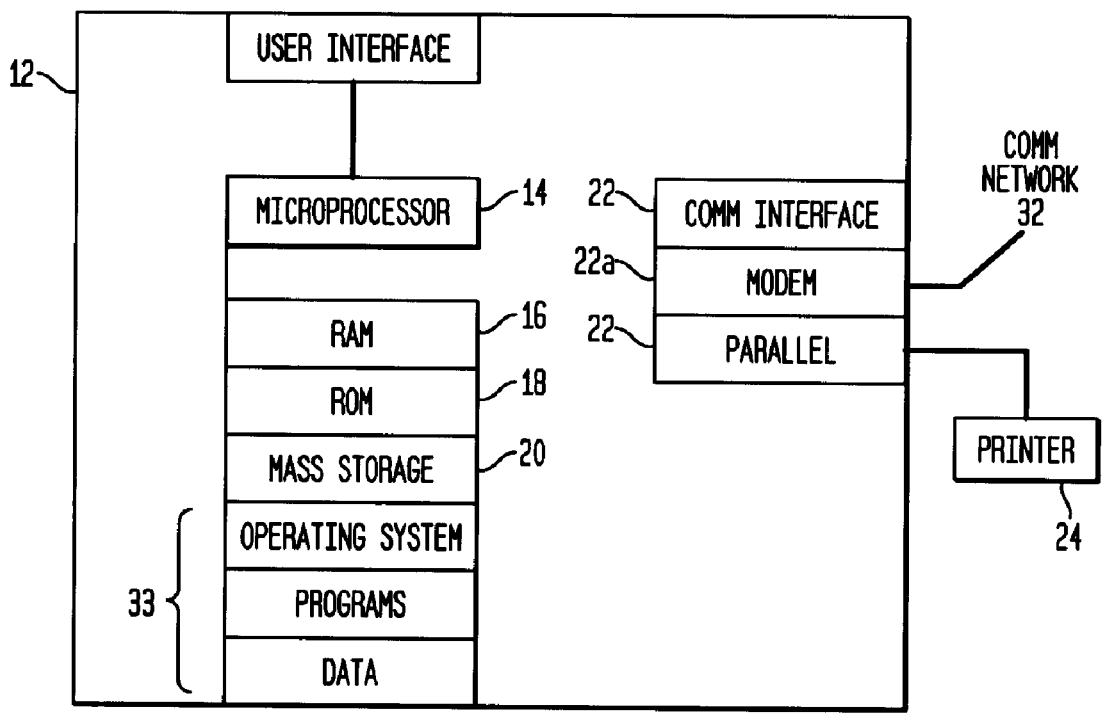
FIG. 1B illustrates system components.

Referring to FIGS. 1A and 1B, the system 10 of the present invention employs a computer 12 equipped with a microprocessor 14, random access memory 16, read-only memory 18, a mass-storage device 20 such as a hard disk, and a communications means 22 to enable the computer 12 to communicate with output devices such as a printer 24.

The communications means 22 may comprise a printer interface, which may be either a parallel interface or a serial interface, and appropriate cabling to the printer. A second communications means 22a may comprise a modem and serial port or SCSI (or SCSII) or Universal Serial Bus ("USB") interface enabling the computer 12 to communicate with communications network 32, such as a public telephone net, the Internet, an extranet, the world wide web or other wired or wireless communications system. Such communications means 22 may also comprise a cable modem and a connection to a cable service, an ISDN modem and ISDN line, a Digital Subscriber Line ("DSL") modem and DSL line, T-1 line, and the like. The system further includes an input means such as keyboard 26, a mouse 28, or similar device such as a Touch-Pad or pointing device such as the ACCU-POINT (Registered Trademark of Toshiba America Information Systems, Inc. for a cursor control device for computers, attached to the computer keyboard), or scanner (not shown), and a visual display means 30 such as a cathode ray tube (CRT) monitor video display terminal, a dual-scan monitor, thin-film transistor, active-matrix monitor, electronic glasses, or their equivalents. Software 33 which is resident in the computer's memory, or which may be stored in the memory of another computer such as a server in a computer network or other central computer includes the operating system necessary for operation of the computer. Among the possible operating systems are Macintosh Operating System. or for IBM-compatible computers, operating systems such as Windows 3.1x, Windows 95, 98, Millennium, NT or 2000, or UNIX or LINUX operating systems. In an embodiment of the present invention, the system is designed for operation under the WINDOWS (Trademark of Microsoft Corp., Redmond, Wash.) operating system.

The present invention can process real-time data provided by a third party data provider 40. FIG. 1A shows the third party data provider 40 as a stand-alone computer; however, it is to be understood that third party data provider 40 can be a central computer such as a mainframe, minicomputer, or other such combinations comprising storage media and computer systems known to those skilled in the art, using as examples only, providers such as Dow-Jones Inc., or LEXIS-NEXIS. The present invention can also process financial data that has been stored, whether on a computer of the user, or stored by another computer system and which is in communication with the computer system of the user. In one embodiment of the present invention, data provided by the third party data provider 40 is transmitted to computer 12 by a communications means such as a high speed data network.

The output of the financial data can be displayed graphically or in the form of a table or spreadsheet on an associated computer screen. Data can also be saved to a means of mass storage, such as a floppy diskette, hard drive, compact disk, digital versatile disk, memory stick and the like. The output can also be directed to a printer, and a hard copy obtained.

The method 100 of the present invention is used in the following manner (FIGS. 2A-3). At step 102 the program is loaded into memory of the user's computer system. Either historical data (H4) 212 or daily data (CH) 214 is obtained at step 104 from a third party provider 40, and entered into the databases. Historical data 212 is stored in a first database 213 and daily data 214 is stored in a second database 215 (at step 106). During the import step 106, the symbols 204 for the securities are imported from the data provider. After the symbols have been imported, the user can choose whether to modify the names of the imported symbols 204. The user determines which security or securities whose performance is to be monitored (step 108). The choice of security is entirely up to the user. At step 110 the user selects those symbols 204 from the databases corresponding to the desired security or securities. The user has an option to manually create a different symbol 204 for a security if the user so desires, such as, for example only, to give one security two different symbols for different tracking purposes. At 112 the user selects those names 240, if any, that have been imported for the security or securities. Because sometimes the names given by the data provider may or may not be suitable for the user's purposes, the user has an option to manually create a different name for a security. Another reason for the user changing a name is, for example only, to give one security two different names and symbols for different tracking purposes.

The symbols 204 and/or names 240 can be sorted (step 114) in either alphanumeric symbol order or Ascii name order, enabling the user to view them in an ordered manner. Symbols and names representing different type of securities, such as stocks and mutual funds, can be sorted further into groupings such as securities and mutual funds, or types of securities, such as, for example only, consumer goods, energy or pharmaceuticals. This step can be bypassed at the user's discretion.

The financial data for the selected securities is analyzed using the Comparison function 202 at either of steps 116, 118 or 120, and the user can choose from one or more comparison functions at steps 116a-d. All of these comparison results can be viewed on a video display (step 122), or printed as either a hard copy of the display, or in the format of a report (steps 122-124) for future reference.

Referring to FIG. 3, a Sequential comparison, using the "With FROM" analysis is employed at step 116a, comparing the percent change in the price of the security over the chosen time period, with the oldest date being defined at the 0.0% change basis.

A Sequential comparison (116b), using the "With TO" analysis compares the percent change in the price of the security over the chosen time period, with the newest date being defined at the 0.0% change basis.

A Sequential comparison (116c), using the "Until TO" analysis compares the percent change in the price of the security over the chosen time period, with the oldest date being defined at the 0.0% change basis. This function enables the user to see how each newer Time relates to the Time before it until the newest time.

A Sequential comparison (116d), using the "Until FROM" analysis compares the percent change in the price of the security over the chosen time period, with the newest date being defined at the 0.0% change basis.

Step 118 employs the "Random" comparison using the same analyses as in 116a-d, using the parameters described above. The "Random" method is defined as choosing dates and times without use of an arithmetical pattern between them; arithmetical patterns are the approach used in the prior art.

A Single Date Comparison Function 270 (step 120) comprises two functions, a single day function 272 and a single date function 274. Single date function 274 compares financial data on any date and hour with financial data on any later date and time; all intervening data points are omitted from the comparison. Single day function 272 compares financial data on any date and time with the corresponding financial data on that same day but with a different time; any intervening data points are omitted from the comparison.

Once the securities' data has been compared using one of the above comparisons, the compared data can be displayed on a video display terminal 30 (step 122), and viewed as a table (122a), a spreadsheet format file (122b) or a graph (122c). The displayed data from step 122 can be printed (124), exported (126) to another financial analysis program if the user wishes to analyze the compared data further in another spreadsheet. The displayed data may also be stored as a data file (step 128). At chosen intervals (step 130), data changes are entered into the Process Log 332.

The user can make a determination as to a course of action to take, if any, regarding any of the securities after any of steps 116-122. This determination is solely at the option of the user, and will be described further in the sections below. The elements of the present invention will be described in greater detail in the following sections.

FEATURES OF THE PRESENT INVENTION

Each function described below can be implemented and programmed by those individuals skilled in the relevant art.

Comparison Function

The Comparison Function 202 ("Compare") is a major element of the present invention, which allows for the simultaneous performance comparisons of securities data.

The Comparison Function 202 allows the user to choose from an almost unlimited list of imported symbols 204 and simultaneously compare up-to-the-second performance for any dozens of symbols 204 during any calendar period. All of these comparison results can be output as a report 206 for future reference. In one embodiment of the invention, the Comparison Function 202 can be initiated by pressing a specific function key on a keyboard, such as the F6 key.

The computer program of the present invention has a size that is less than 4 megabytes, exclusive of securities data. The program of the present invention and its associated data are designed to reside entirely on the user's computer 12. By being resident on the user's computer, this functionality eliminates downtime that can occur while waiting to receive data from another source, such as through an Internet connection, or by delays of time sensitive results that may occur using a shared server.

The present invention includes an import feature 210, in which financial securities data can be obtained from one or more third-party data providers 40, such as directly from, for example only and not intended to be any limitation, the Dow-Jones Publishing Company (Princeton, N.J.), Standard and Poors (New York, N.Y.), or Moody's Analytical Services (New York, N.Y.). The user has the ability to import the following:

a. the historic data 212 ("Historic-H4") for the desired security or securities for any desired calendar length of time. This step is usually performed when first beginning the analysis of a particular security. In an embodiment of the present invention, historic data 212 represents either the closing average price of the security (as NAV), or the Adjusted Net Asset Value ("ANAV") for a security such as a mutual fund, at 4:00 PM.

b. the daily data 214 "(Daily-CH")" for the desired security or securities. This step is generally done for only one day at a time, and that day is generally "today", i.e., the data for the date on which the importation is being performed. The user has a choice of using entirely historical data 212, for that security, entirely daily data 214, or a merge of both types of data. In addition, daily data 214 may be accumulated into a history of days. In an embodiment of the present invention, the daily data 214 is the current price of the security at a given hour, which does not necessarily have to be 4:00 PM. For securities such as mutual funds which are priced using the Net Asset Value ("NAV") method, the daily data 214 of such a fund is expressed as the NAV.

c. a merge 216 of both the historic 212 and daily 214 data for the given security or securities.

The Comparison function 202 is employed to compare the performance of symbols using any of the above data combinations. A user can employ the Comparison Function 202 to compare just historic data 212, just daily data 214 or combinations thereof, depending the user's needs.

The data format of the present invention accommodates realtime data generated 24 hours a day when a data snapshot is taken and assigned to any of the 7 hourly breakpoints.

The user can determine the freshness of the data in the databases based on the data date-range shown and the breakpoints for the newest date of both databases. By entering a date of interest as a "TOPoint" (see Examples below), data availability can be verified by the breakpoints automatically selected by the software.

As the updated data is received from the third party provider 40, data from the imported symbols and their corresponding data is merged into the databases 213 and 215.

Because the present invention employs a comparison of changing data with a benchmark data point, it is suitable for uses other than strictly for securities analysis. Thus, up-to-the-moment global/regional performance monitoring of stock market equities, indices, sales, government and/or corporate budgets, inventory control, or scientific applications such as environmental monitoring, process monitoring and the like can also be performed using the present invention. Sales, budgets, cost data, inventory data, margin data, earnings data, income tax data, depreciation data, and amortization data can also be compared using the present invention. Even non-financial comparisons can be made using the present invention.

Import Function

The Import Function 210 of the present invention is a non-proprietary open import program 210 which enables a data file to be imported into the databases when that data conforms to either of the standard formats employed by the present invention (the historic-H4 212 or daily-CH 214 data formats). Data can be obtained from numerous third party data providers 40.

To facilitate the user's learning of the present invention, the present invention includes Historic-H4 file specifications 232 and daily-CH file specifications 234 and sample data files 236 for emulation.

A user can employ the standard symbols for financial securities provided them by the data provider. Alternatively, the user can employ functions of the present invention such that the user can: in the historic-H4 212 and daily-CH 214 data, manually create or change names 240 for a security; in the daily-CH 214 data, manually create symbols 204; in the daily-CH 214, manually create or edit data.

View Master Function

The View Master Function 238, which can also be called the Create Favorite Names Function 238, allows a user to let a security's name remain the same as it was when it was downloaded from the third party provider 40 or create a name 240 to always be associated with any symbol 204. By assigning a prefix character to a names 240, groups 244 and subgroups 246 of symbols can be user defined, e.g., "C BIO-TECH".

A sort feature 248 enables the user to sort the symbol 204/name 240 lists by either symbol 204 or name 240 in ASCII order. In an embodiment of the present invention, the View Master Function 238 is actuated by depressing a combination of the Control and V keys (Ctrl+V) simultaneously.

Date-Range Copy or Delete Function

The Date-Range Copy or Delete Function 250 enables the user to Copy 252 or delete 254 a symbol's data for any period of time. In an embodiment of the present invention, the Date-Range Copy or Delete Function 250 is actuated by depressing a combination of the Control and B keys (Ctrl+B) simultaneously. Once the function has been actuated, menus appear allowing the user to choose the date range from which to choose data, and a choice of whether to copy 252 the data to another part of the database, or to delete 254 the data from the database. The Date-Range Copy Function 252 can be applied to data in daily CH 215 database. The Delete Function 254 can be applied to data in both the historical H4 213 and daily CH 215 databases. Existing historical H4 data 214 is automatically deleted during the import function, which updates the database.

Comparison Function

The Comparison Function 202 enables the user to compare security data over time in any way the user may choose. In an embodiment of the present invention, this function is initiated by striking the F6 function key of a keyboard. Financial data can be analyzed over a period of time either sequentially, randomly, or comparing one day's data with that of just another single date. The user can choose a data snapshot taken at one of the hourly breakpoints, for example, between 10 am-4 pm, as part of the FROM and TO Points employed in this comparison feature.

In an embodiment of the present invention, the use of the Comparison Function is seen on a video display terminal as:

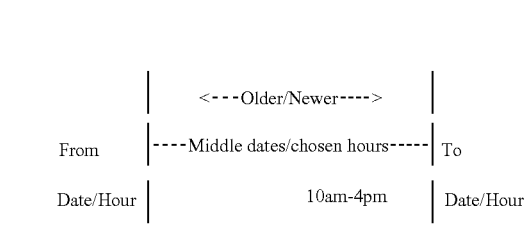

where the FROM section represents the older date while the TO section would represent the newer data.

The present invention emphasizes present securities data and future perspectives. The present invention is primarily concerned with the most recent financial data (today) and what might happen in the future, taking both short term (tomorrow) and longer term perspectives.

Some examples of how the calculation of the comparison function 202 express this relationship are illustrated below. As indicated below, the reference data points and the chosen data points can vary.

EXAMPLE 1a

SEQUENTIAL Dates/Chosen Hours (10 am-4 pm)

EXAMPLE 1a1

With FROM

This function enables the user to compare financial data at any FROM point (date and hour) with all newer data (Middle dates and hours) and stop at any newest TO date and hour. This comparison can be expressed mathematically by the equation where:

$$((TOPoint-FROMPoint)/FROMPoint)*100=+/-\%,$$

wherein the financial data at the FROM date is subtracted from corresponding financial data at the TO point, and converted into a percentage change ("%") compared to the FROM point.

An example of this function, showing how each newer time relates to the oldest time is shown below in Table 1:

In this example, BIOTECH refers to an exemplary financial security in the Biotechnology field, and is shown for purposes of example only.

TABLE 1

| Comparison Using "With FROM" Point | | | |
|---|---|---|---|
| | | BIOTECH | |
| Hour | Date | $ Price | % Change |
| 4 PM | Oct. 8, 2000 | 37.31 | 0.00 |
| 4 PM | Oct. 9, 2000 | 36.78 | −1.42 |
| 4 PM | Oct. 10, 2000 | 36.50 | −2.17 |
| 4 PM | Oct. 11, 2000 | 35.96 | −3.62 |
| 4 PM | Oct. 12, 2000 | 31.60 | −15.30 |

As can be seen from this Table, the comparison function is an iterative process, where after a first comparison is made using the data from the first two dates in the group, each additional dates' data are compared with that of the first, or "FROM Point", until the data from all of the data points has been compared. In this instance, the "FROM Point" is the reference data point, and all other dates are chosen data points.

As seen in this example, the security showed a loss of over 15% in a week's time period. For example only, if the user has rules wherein the user will sell a security after a certain percentage loss, for example, a loss of greater than 10%, such a change as shown above would tell the user to sell that security. If the user's rule is to sell when the security had incurred a 20% loss, this comparison would suggest to that user that the security is losing value, and to be prepared to sell shortly.

EXAMPLE 1a2

With TO

This comparison function enables the user to compare financial data at any TO point (date and hour) with each older (Middle date and hour) data point and stop at any older (FROM) date and hour. This comparison can be expressed mathematically by the equation where:

$$((TOPoint-FROMPoint)/FROMPoint)*100=+/-\%$$

wherein the financial data at the FROM point is subtracted from corresponding financial data at the TO point, and converted into a percentage change ("%") compared to the FROM point. As shown in Table 2 below, data for the newest Time (probably today) relates to each older Time.

TABLE 2

| Comparison Using "With TO" Point | | | |
|---|---|---|---|
| | | BIOTECH | |
| Time | Date | Price | % Change |
| 4 PM | Oct. 8, 2000 | 37.31 | −15.30 |
| 4 PM | Oct. 9, 2000 | 36.78 | −14.08 |
| 4 PM | Oct. 10, 2000 | 36.50 | −13.42 |
| 4 PM | Oct. 11, 2000 | 35.96 | −12.12 |
| 4 PM | Oct. 12, 2000 | 31.60 | 0.00 |

EXAMPLE 1a3

Until TO

This function enables the user to compare financial data at any FROM point (date and hour) with a next chosen hour for all Middle dates and hours and stop at any TO date and hour. This comparison can be expressed mathematically by the equation where:

$$((TOPoint-FROMPoint)/FROMPoint)*100=+/-\%$$

As shown in Table 3 below, starting at the oldest Time, one can see how each newer Time relates to the Time before it until the newest Time.

TABLE 3

| Comparison Using "Until TO" Point | | | |
|---|---|---|---|
| | | BIOTECH | |
| Hour | Date | $ Price | % Change |
| 4 PM | Oct. 8, 2000 | 37.31 | 0.00 |
| 4 PM | Oct, 9, 2000 | 36.78 | −1.42 |
| 4 PM | Nov. 10, 2000 | 36.50 | −0.76 |
| 4 PM | Oct. 11, 2000 | 35.96 | −1.48 |
| 4 PM | Oct. 12, 2000 | 31.60 | −12.12 |

EXAMPLE 1a4

Until FROM

This function enables the user to compare financial data at any TO point (date and hour) with prior chosen hours for all Middle dates and hours and stop at any older FROM date and hour. This comparison can be expressed mathematically by the equation where:

$$((FROMPoint-TOPoint)/TOPoint)*100=+/-\%$$

wherein the financial data at the TO point is subtracted from corresponding financial data at the FROM point, and converted into a percentage change ("%") compared to the TO point. As shown in the example below, data for the newest Time (probably today) relates to each older Time.

Table 4 shows how each Time relates to the Time after it until the oldest Time.

TABLE 4

Comparison Using "Until FROM" Point

BIOTECH

| Hour | Date | $ Price | % Change |
|------|------|---------|----------|
| 4 PM | Oct. 8, 2000 | 37.31 | 1.44 |
| 4 PM | Oct. 9, 2000 | 36.78 | 0.77 |
| 4 PM | Oct. 10, 2000 | 36.50 | 1.50 |
| 4 PM | Oct. 11, 2000 | 35.96 | 13.80 |
| 4 PM | Oct. 12, 2000 | 31.60 | 0.00 |

As seen in Table 4, the greatest percentage change in the value of the security occurred in the previous day, with the other previous days showing only minor percentage losses in the security's value.

Comparisons of data can be performed using data from one or both of the databases, and can be facilitated through the use of keystroke combinations.

In an embodiment of the present invention, a comparison using just historic data 214 is represented by the keystroke combination of (a) F9−ANAV+H4TODCH=OFF.

F9 represents a particular function key which is programmed to call up data from the historical H4 database 213, in which database the security value is represented as the Adjusted Net Asset Value ("ANAV") if the security is a mutual fund, or the Net Asset Value ("NAV") if the security is not a mutual fund, such as equities, indices and the like. The keystroke combination H4TODCH=OFF affects H4 (historical, 4 PM) symbol selection. When ON, the most recent comparison point (TO Point) is a Current Hourly (CH) database 214 date, and all prior dates are H4 212 database dates. When OFF, all dates are H4 database 212 data dates.

The comparison for symbols using just daily-CH data is represented by the keystroke combination (b) F8-NAV+H4TODCH=ON or OFF.

F8 represents a particular function key which is programmed to call up data from the current hourly CH database 215, in which database the security value is represented as the Net Asset Value ("NAV"), and H4TODCH=ON or OFF represents that the "TOPoint" employing current hourly data 214 has either been turned on or off.

Combination (c) is a comparison of Symbols 204 using just historic-H4 and/or just daily-CH data is represented by the keystroke combination (c) F9−ANAV+H4TODCH=OFF and/or F8-NAV.

The comparison of symbols 204 using merged historic-H4 and daily-CH data together is represented by the keystroke combination (d) F9−ANAV+H4TODCH=ON.

The comparison of symbols 204 using merged historic-H4 and daily-CH data together combined with symbols using just daily-CH data is represented by the keystroke combination (e) F9−ANAV+H4TODCH=ON and F8-NAV.

In use, formulae (d) and (e) enable the user to do the following on a daily basis: First, data is imported from third party provider 40, to update the historic data database 213. This update step 104 collects all data through late on the previous day of trading; this will generally be late yesterday for a user who employs the present invention on a daily basis. For using formulas (a), (b), (c), (d) and (e), the user can obtain current (generally today's) current data 214, using a communications means 22, such as a realtime narrowband modem or wireless communications means, updating daily database 215 with data from up to 7 hourly breakpoints, generally over the time period from 10 AM-4 PM.

EXAMPLE 1b

RANDOM DATES ("R Dates")

The Random Dates Function 260 combines all of the features of the present invention described in Examples 1a1 through 1a4, but instead of including every Middle date and data in the analysis, enables the user to include up to 15 random dates. The dates are chosen by the user, in any random order desired by the user. The FROM and TO Points can also be randomly chosen by the user. A date checking function 264 compares each random date chosen to determine whether the chosen date is a weekend date, or a date for which data could have been available. If the date is verified, the date is entered. Once all of the dates have been verified and entered, the present invention performs the comparison functions chosen by the user. These mathematical calculations are identical to those of Examples 1a1 through 1a3, but the random dates financial data are substituted appropriately. When the data from the random data comparisons are displayed, the random dates chosen are displayed in chronological order.

EXAMPLE 1c

SINGLE Date ("S-Date")

Single date function 270 function compares financial data on any FROM Date/any hour with any later TO Date/any hour. All in between Dates/Hours are omitted in this function.

Compare Results Function

The Compare Results function 300 enables the user to view the results of the various comparisons described in the comparison section in a format that best suits the user's needs, such as in a table 302, spreadsheet 304 or a graph. In an embodiment of the present invention, the graph is a 3-Dimensional ("3-D") graph 308.

Also included in any of the output forms displayed (on the video display terminal 30) are the total number of symbols 204 for which financial data was available, and the number of symbols whose financial data was chosen and the number of symbols whose financial data was calculated. This indicates whether the data output represents data from all or a part of the securities being followed by the user.

EXAMPLE 2a

TABLE function 302

As shown below, the financial data is displayed in the form of a Table, in which financial data for those symbols 204 with sufficient data are calculated. In cases where a focal date (such as FROM or TO Point) is missing, an error message is displayed, and is noted in the Process Log 332. In cases where certain financial data is missing, the missing price data is marked 'na' ("not available") in the Table. As shown below, the output lists symbols 204 and points vertically, and this is similar whether the user selects the screen display mode (default mode) or selects to have the table printed.

|  | $ Price | % Change |  |  |
|---|---|---|---|---|
| Point 1 | $ | % | Symbol a | Name a |
| Point 2 | $ | % |  |  |
| Point (n) | $ | % |  |  |
| Point 1 | $ | % | Symbol b | Name b |
| Point 2 | $ | % |  |  |
| Point (n) | $ | % |  |  |
| Point (n) | $ | % | Symbol (n) | Name (n) |

EXAMPLE 2b

SPREADSHEET function 304

As shown below, the financial data is exported in the form of a spreadsheet file 304, and the financial data for those symbols 204 with sufficient data are calculated. Where certain financial data is missing, that point in the spreadsheet remains blank so that the data remains compatible with downstream analytical tools. The symbols 204 and names 240 can be output as a printed report 206 enabling the user to identify which symbols correspond to data in the cells of the spreadsheet. The spreadsheet data can be exported for use in other analytical programs, in formats such as .xls (Microsoft Excel), .wk1 (Lotus 123), .dbf (dBase format), .sdf, and ASCII. The .sdf file format is System Data Format, which is defined as an ASCII text file in which records have a fixed length and end with a carriage return and line feed; fields are not delimited (Microsoft FoxPro Language Reference, published by Microsoft Corp., Redmond, Wash., 1993).

The spreadsheet export function 306 lists symbols, prices (Symbol+8) and performances (Symbol+9) horizontally and points vertically, enabling an endless banner print output where appropriate.

The format of a representative spreadsheet 304 is illustrated below:

|  | Symbol 8A | Symbol 9A | Symbol 8B | Symbol 9B | Symbol (n)8 | Symbol (n)9 |
|---|---|---|---|---|---|---|
| Point 1 | $ | % | $ | % | $ | % |
| Point 2 | $ | % | $ | % | $ | % |
| Point (n) | $ | % | $ | % | $ | % |

EXAMPLE 2c

Graph Function 308

Although not shown below, the financial data can also be displayed in the form of a Graph 308. The financial data for those symbols 204 with sufficient data are calculated. Where certain financial data is missing, that point remains blank on the graph for visual clarity. The symbols 204 and names 240 can be output as a printed report 206 enabling the user to identify which symbols correspond to which graphical data. The graph function 308 displays the graph on a video display monitor 30 as a 3-dimensional color graph, and has the capability to adjust the scale of the graph to fit the particular display (autoscale function 310). The axes of the graph are:
X Axis=Up to 126 symbols.
Y Axis=Percent changes.
Z Axis=Times.

In an embodiment of the present invention, each symbol is associated with a distinct color for data that is above or beneath the Y-axis' zero plane. Generally, the Y-axis zero plane is black. The graphing function enables a graph to be rotated or have its orientation shifted. In such instances where negative data is presented, such negative data can be observed by the user upon changing the orientation of the graph. The graphing function includes a means for displaying a gap to indicate where data was not available for calculation, either because of a gap in the database, or no data was available prior to the date of issuance of a recently issued security. The graph generates a datafile "color.dbf" which can be used by third-party graphing engines.

Archive/Restore Function

The Archive/Restore function 312 allows the user either to archive data 314 to or retrieve 316 data from the database. This function is used when, for example, (a) the user has more data stored than necessary for the user's tasks, or (b) to improve the performance of the program by reducing the size of bulky files. In an embodiment of the present invention, this function is activated by pressing a combination of keys, such as the Control ("Ctrl") and the "R" key (Ctrl+R). The user can then select either the Archive function 314 or the Restore function 316, select which data is to be archived, or to be restored into a current analysis. The database includes an entire or partial date-range of historic data 212 and/or daily data 214 databases and all symbols 204 and names 240. The Archive/Restore function 312 also includes an Erase option 318, allowing the user to erase stored date-ranges. Data files are stored with file overwrite protection 320, using methods of overwrite protection known to those skilled in the art.

When the Archive/Restore function 312 is used with the Erase Databases 322 function, the combination allows any list of symbols 204 and names 240 and their data to be swapped out and replaced with a different list of symbols and/or names and their data, such that a user can monitor, for example, sales data, by replacing Stock Market Equities with Sales data. Once the appropriate Sales data, or other data is entered, or imported from other sources, or both, the present invention enables the user to employ the present invention as a means of analyzing its sales figures, or other functions which vary and which can be compared with a benchmark or standard point of reference, such as income, bank account balance, net worth and the like.

Merge Function

A Merge function 324 enables the symbol 204 and name 240 lists, with or without their data, to be merged and/or to be automatically sorted by criteria chosen by the user, such as alphabetical, numerical, etc.

Sort Function

The Sort function 248 enables the historic data 212 and daily data 214 to be viewed, combined with, and sorted by symbol, date or name, in alphabetical, numerical, or other order as desired by the user. Using the Sort function 248, a user can view the combined historic data 212 and daily data 214 for any one or more individual symbols 204. The Sort results can be viewed on a video display terminal 30, or exported in formats such as .xls, .wk1, .dbf, .sdf, and ASCII. In an embodiment of the present invention, the Sort function 248 is activated by depressing a combination of keys, Control and V simultaneously (Ctrl-V).

Import Functions

The present invention enables the user to import data from third party providers 40 as the user desires by manually activating import default 326. This invention looks up the file path and file name that have been user-chosen and stored. It next imports the data by using the combination of System Defaults-F7 326. The user then chooses between a Manual Import Function 328 and an Auto Import Scheduler Function 330. The Manual Import Function 328 is activated manually by the F5 function key.

In an embodiment of the present invention, the Scheduler Function 330 is actuated by depressing a combination of the Control and S keys (Ctrl+S) simultaneously, upon which a menu is presented allowing the user to turn this function on, the type of data to be imported, the frequency, and the time scheduled for the data to be imported. The data can also be imported over a network, such as a LAN or WAN, if the user's system is a part of such a network, or via other communications means, whether wired or wireless. By using the Scheduler function, the present invention will be ready with updated data for the user to employ in comparing securities information.

Erase Database Function

The Erase Database Function 322 enables the user to erase the entire historic data database 213 and/or the current hourly data database 215 with Symbols-Names and/or Process Log 332. In an embodiment of the present invention, the Erase Database 322 function is actuated by simultaneously depressing the Control and E keys (Ctrl+E) on the keyboard.

Using the Erase Database function 322 the user can strip the program down to its database engine; the entire database is erased. The Erase Database 322 function also enables the user to remove data that may have been corrupted, such as by power failures, surges and the like.

The Erase Database 322 function can also be used with the Archive/Restore 312 function described above. When these two functions are used in combination, this combination enables the user to swap symbols and data as has been described.

Process Log Function

The Process Log Function 332 is a recording or tracking function that records all Import, Comparison Failures, Archive/Restore and Erased Database events in a Process Log database 334. The Process Log database 334 is accessible to and employed by the user to monitor changes in the master database of the present invention. The Process Log Function 332 is useful for monitoring data transfers that may have occurred, and for symbol comparison failures. In an embodiment of the present invention, the Process Log 332 Function is actuated by simultaneously depressing the Control and L keys (Ctrl+L).

In an embodiment of the present invention, the Process Log Function 332 is on. During a Comparison Function 202, the user will see color-coded flashing messages on the video display terminal 30 indicating those symbols 204 whose data was not calculated because of missing FROM or TO data. In an embodiment of the present invention, a yellow flashing message indicates that the FROM data of a security was not calculated, while a green flashing message indicates that the TO data of a security was not calculated. The colors of the flashing messages can be varied by methods known to those skilled in the art.

The Process Log database 334 log created can be: viewed on the video display terminal 30; printed; or date-range deleted.

Other Utilities

The present invention includes a Help file and a Glossary file. The Help file describes the various functions of the program, while the Glossary file defines the terminology employed by the present invention. The content of both the Help and Glossary files are expressly herein incorporated by reference.

Operating System Compatibility a. Microsoft (R) Windows (TM) Attributes:

The present invention is designed to be cross-platform transportable. In an embodiment of the present invention, it is written in a relational database tool that is compatible with the Disk Operating System ("DOS"), such as in FOXPRO (TM, owned by the Microsoft Company, Redmond, Wash.), making it cross-platform transportable.

b. Windowing Functions

The present invention includes a windowing function 336 in which the invention can be operated in either a Microsoft WINDOWS (TM) environment, or in DOS mode, on a video display terminal 30. When the present invention is operating in a WINDOWS (TM) environment, the DOS window can be reduced to a small size on the screen (a "DOS box"), such that a fully functional screen of the present invention can have a size ranging from being barely larger than that of a simple icon seen in a WINDOWS (TM) or enlarged to any font size. This windowing functionality allows the present invention (called Wave-runner (TM)) to be displayed and working side-by-side with other launched programs in the WINDOWS (TM) environment. The elements of the windowing function 336 are conventional, as is known to those skilled in the art, and will not be further discussed.

c. Compatibility with Handheld and Pocket Devices:

The present invention uses a utility function 338 called XT-CE (pronounced ecstacy) which is a DOS environment emulation program, and is obtained from a third party supplier for devices compatible with the Microsoft CE (TM, registered trademark of Microsoft Corp., Redmond, Wash.) operating system. This utility enables handheld devices that operate using the Microsoft Pocket CE (TM) operating system to run the present invention. This utility is available from Microsoft Corp. at the company's web site (www.microsoft.com). Another is "Pocket DOS" of the same functionality, also available at www.microsoft.com.

d. Wireless Applications

In another embodiment of the present invention, the invention can be used on a wireless device which enables the user to communicate with a third party data provider using wireless communication methods, such as by analog or digital cellular communication, or other communications frequencies.

A theme common to most securities prospectuses, and routinely stated in commentaries on the financial markets, is that generally the past performance of a security is no guarantee that it will perform similarly in the future. However, historical analysis of financial information has led to the development of many theories about how the equities market may perform in the future. Some factors include whether there have been major wars, economic depressions, presidential elections. One recent such indicator, termed the "Super Bowl factor", suggests that if the winning team is from the National Conference, the stock market will have an "up" year, and if the winning team is from the American Conference, the stock market will have a "down" year. Using the present invention, an investor can watch the recent trends of a security, and use these trends in conjunction with the investor's knowledge or other parameters to make decisions whether to buy or sell a security, or to take other actions, such as purchase or sale of options or puts, etc. based on the security's recent performance.

Therefore, although this invention has been described with a certain degree of particularity, it is to be understood that the present disclosure has been made only by way of illustration and that numerous changes in the details of construction and arrangement of parts may be resorted to without departing from the spirit and scope of the invention.

I claim:

1. A method for analyzing and representing financial data, the method comprising the steps of:
   obtaining a plurality of data points related to a security, each data point comprises associated data regarding the security;
   designating one of the data points as a reference data point;
   choosing one of the data points as a chosen data point, wherein the chosen data point further comprises a plurality of individual data points, not using an arithmetical pattern;
   utilizing a computer to examine the data of the chosen data point with the data of the reference data point, thereby producing a data analysis; and
   producing a representation of the data analysis.

2. The method as described in claim 1, further comprising the step of ordering the chosen individual data points according to an ordering function prior to the examining step, thereby producing an ordered series and an ordered position corresponding to each chosen individual data point.

3. The method as described in claim 2, further comprising the step of reporting the data analysis.

4. The method as described in claim 2, wherein the examining step comprises utilizing a comparison expressed by the equation $$((\text{TOPoint}-\text{FROMPoint})/\text{FROMPoint})*100=+/-\%,$$

wherein "FROMPoint" is the reference point and "TOPoint" is each of the chosen individual data points, and each ordered position corresponding to TOPoint follows in the ordered series the ordered position corresponding to FROMPoint.

5. The method as described in claim 2, wherein the examining step comprises utilizing a comparison expressed by the equation $$((\text{TOPoint}-\text{FROMPoint})/\text{FROMPoint})*100=+/-\%,$$

wherein "TOPoint" is the reference point and "FROMPoint" is each of the chosen individual data points, and each ordered position corresponding to TOPoint follows in the ordered series the ordered position corresponding to FROMPoint.

6. The method as described in claim 2, wherein the reference point further comprises a plurality of reference individual data points, there being a one-to-one correspondence between the reference individual data points and the chosen individual data points.

7. The method as described in claim 6, wherein the examining step comprises utilizing a comparison expressed by the equation $$((\text{TOPoint}-\text{FROMPoint})/\text{FROMPoint})*100=+/-\%,$$

wherein each pair of "FROMPoint" and "TOPoint" are each corresponding reference individual data point and chosen individual data point.

8. The method as described in claim 6, wherein the examining step comprises utilizing a comparison expressed by the equation $$((\text{FROMPoint}-\text{TOPoint})/\text{TOPoint})*100=+/-\%,$$

wherein each pair of "TOPoint" and "FROMPoint" are each corresponding reference individual data point and chosen individual data point.

9. The method as described in claim 2, wherein the ordering function comprises date order and each data point comprises the value of the security at a specific date.

10. The method as described in claim 2, wherein the ordering function comprises date-and-time order and each data point comprises a value of the security at a specific date and time.

11. The method as described in claim 2, further comprising the step of exporting the data analysis to a second method of analyzing financial data.

12. A system for analyzing and representing financial data, the system comprising:
    a means for obtaining a plurality of data points related to a security, each data point comprising associated data regarding the security;
    a means for designating one of the data points as a reference data point;
    a means for choosing one of the data points as a chosen data point, wherein the chosen data point further comprises a plurality of chosen data points, not using an arithmetical pattern;
    a computer means for examining the data corresponding to the reference data point with the data corresponding to the chosen data point, thereby producing a data analysis; and
    a means for representing the data analysis.

13. The system as described in claim 12, wherein the examining means comprises a means for ordering the chosen data points according to an ordering function, thereby producing an ordered series and an ordered position corresponding to each chosen individual data point.

14. The system as described in claim 13, wherein the examining means further comprises a means for performing a comparison expressed by the equation $$((\text{TOPoint}-\text{FROMPoint})/\text{FROMPoint})*100=+/-\%,$$

wherein "FROMPoint" is the reference point and "TOPoint" is each of the chosen individual data points, and each ordered position corresponding to TOPoint follows in the ordered series the ordered position corresponding to FROMPoint.

15. The system as described in claim 13, wherein the examining means further comprises a means for performing a comparison expressed by the equation $$((\text{TOPoint}-\text{FROMPoint})/\text{FROMPoint})*100=+/-\%,$$

wherein "TOPoint" is the reference point and "FROMPoint" is each of the chosen individual data points, and each ordered position corresponding to TOPoint follows in the ordered series the ordered position corresponding to FROMPoint.

16. The system as described in claim 13, wherein the reference point further comprises a plurality of reference individual data points, there being a one-to-one correspondence between the reference individual data points and the chosen individual data points.

17. The system as described in claim 16, wherein the examining means further comprises a means for performing a comparison expressed by the equation $$((\text{TOPoint}-\text{FROMPoint})/\text{FROMPoint})*100=+/-\%,$$

wherein each pair of "FROMPoint" and "TOPoint" are each corresponding reference individual data point and chosen individual data point.

18. The system as described in claim 16, wherein the examining means further comprises a means for performing a comparison expressed by the equation $$((\text{FROMPoint}-\text{TOPoint})/\text{TOPoint})*100=+/-\%,$$

wherein each pair of "TOPoint" and "FROMPoint" are each corresponding reference individual data point and chosen individual data point.

19. The system as described in claim 13, wherein the ordering function comprises date order and each data point comprises a value of the security on a specific date.

20. The system as described in claim 13, wherein the ordering function comprises date-and-time order and each data point comprises a value of the security at a specific date and time.

21. The system as described in claim 13, further comprising a means for exporting the data analysis to a second means of analyzing financial data.

22. A method for analyzing and representing data of a category, the system comprising the steps of:
   obtaining a plurality of data points related to the category, each data point comprises associated data regarding the category;
   designating one of the data points as a reference data point;
   choosing one of the data points as a chosen data point, wherein the chosen data point further comprises a plurality of chosen data points, not using an arithmetical pattern;
   utilizing a computer to examine the data corresponding to the reference data point with the data corresponding to the chosen data point, thereby producing a data analysis; and
   producing a representation of the data analysis.

23. The method as described in claim 22, further comprising the step of ordering the chosen data points prior to the examining step.

24. The method as described in claim 23, further comprising the step of reporting the data analysis.

25. The method as described in claim 23, wherein the category comprises finance.

26. The method as described in claim 25, wherein the associated data is chosen from the group consisting of sales data, inventory data, cost data, margin data, income tax data, depreciation data, and amortization data.

27. A system for analyzing and representing data of a category, the system comprising:
   a means for obtaining a plurality of data points related to the category, each data point comprises associated data regarding the category;
   a means for designating one of the data points as a reference data point;
   a means for choosing one of the data points as a chosen data point, wherein the chosen data point further comprises a plurality of chosen data points, not using an arithmetical pattern;
   a computer means for examining the data corresponding to the reference data point with the data corresponding to the chosen data point, thereby producing a data analysis; and
   a means for representing the data analysis.

28. The system as described in claim 27, wherein the examining means comprises a means for ordering the chosen data points prior to examining the data.

29. The system as described in claim 28, further comprising a reporting means to report the data analysis.

30. The system as described in claim 27, wherein the category comprises finance.

31. The system as described in claim 30, wherein the associated data is chosen from the group consisting of sales data, inventory data, cost data, margin data, income tax data, depreciation data, and amortization data.

* * * * *